(12) United States Patent
Hoeth

(10) Patent No.: US 8,912,901 B2
(45) Date of Patent: Dec. 16, 2014

(54) PORTABLE SECURITY AND PROTECTION ENCLOSURES

(76) Inventor: Gregory J. Hoeth, Cleveland, OH (US)

( * ) Notice: Subject to any disclaimer, the term of this patent is extended or adjusted under 35 U.S.C. 154(b) by 118 days.

(21) Appl. No.: 13/560,359

(22) Filed: Jul. 27, 2012

(65) Prior Publication Data

US 2013/0193005 A1  Aug. 1, 2013

Related U.S. Application Data

(63) Continuation-in-part of application No. 12/504,140, filed on Jul. 16, 2009, now abandoned.

(60) Provisional application No. 61/081,113, filed on Jul. 16, 2008.

(51) Int. Cl.
*G08B 21/00* (2006.01)
*G10G 7/00* (2006.01)

(52) U.S. Cl.
CPC .................................... *G10G 7/005* (2013.01)
USPC ..................... 340/540; 340/568.1; 340/571

(58) Field of Classification Search
USPC ........ 340/540, 546, 545.6, 545.7, 545.8, 564, 340/568.1, 568.7, 555, 571
See application file for complete search history.

(56) References Cited

U.S. PATENT DOCUMENTS

| | | | |
|---|---|---|---|
| 8,417,442 B2 * | 4/2013 | Johnson et al. | 701/118 |
| 2002/0104013 A1 * | 8/2002 | Ghazarian | 713/200 |
| 2006/0274493 A1 * | 12/2006 | Richardson et al. | 361/683 |
| 2008/0227446 A1 * | 9/2008 | Wubker | 455/427 |
| 2009/0009945 A1 * | 1/2009 | Johnson et al. | 361/681 |
| 2009/0040367 A1 * | 2/2009 | Zakrzewski et al. | 348/370 |
| 2012/0303520 A1 * | 11/2012 | Huang | 705/39 |

* cited by examiner

*Primary Examiner* — Daniel Previl
(74) *Attorney, Agent, or Firm* — Black, McCuskey, Souers & Arbaugh, LPA

(57) ABSTRACT

Portable security and protection cases and enclosures for storage and transport of high value articles susceptible or vulnerable to theft, loss or irreparable damage. The cases and enclosures include reinforced structural shells electronic anti-theft and climate control and monitoring measures, electronic and non-electronic anti-breakage performance characteristics and automated locking and control systems.

12 Claims, 3 Drawing Sheets

PORTABLE SECURITY AND PROTECTION ENCLOSURES

RELATED APPLICATIONS

This application is a continuation-in-part of U.S. patent application Ser. No. 12/504,140, filed on Jul. 16, 2009, which claims priority to U.S. Provisional Patent Application No. 61/081,113, filed on Jul. 16, 2008. A copy of each of the above-referenced patent applications is incorporated herein by reference in its entirety.

FIELD OF THE INVENTION

The present disclosure and related inventions pertain to portable security and protection devices including anti-theft, anti-breakage and climate control for protection and transport of valuable objects such as musical instruments and electronic equipment, artwork and collectibles, currency, precious metals and jewelry, firearms, food and beverages including wine and high end sports equipment.

BACKGROUND OF THE INVENTION

Valuable articles are frequently vulnerable to theft, breakage and loss. While insurance policies cover most of these items, many are one-of-a-kind and are therefore irreplaceable and/or the opportunity cost and timetable required to replace such items is prohibitive. Storage and transport cases of the prior art for various objects, including objects of significant value, have been made solely for physical protection of the object by relying on the structural strength of the outer shell of the case, and providing some internal protection commonly by use of foam or other cushioning. In general, generic cases of this type do not provide any protection to the contained objects other than against damage from direct mechanical impact.

SUMMARY OF THE INVENTION

The present disclosure and related inventions provide new types of protective enclosures for valuable articles that include means for securely encasing, tracking, monitoring, and protecting articles of value for storage or transport. The protective enclosures of the present inventions are herein referred to in the alternative as "housing", "enclosure", "protective enclosure", "case" or "smart case". In one representative embodiment of the invention, a protective enclosure includes within a housing one or more electronic devices which provide various types of information on the case, including but not limited to: location, and location and travel history; internal and external conditions such as temperature, humidity; mechanical events such as openings, closings, lock and unlock, acceleration, impact and image capture for video or photo record of surrounding environment. The enclosure is suitably equipped and programmed with necessary hardware and software to acquire information of this type on the physical condition, environment and physical history and record and/or transmit of otherwise make such information available. The enclosures are provided with the required control means to allow communication with the device and means for porting this sensor and receiver information to the Internet and hence, to remote communication tools, such as smart phones and Web servers. The enclosures are physically configured to provide maximum protection to the contents and to contain all of the necessary tracking and recording electronics. Novel features of the enclosure configurations include the use of carbon fiber and other ultra-strong materials in an outer shell, high-strength/low-weight structural cores such as honeycomb internal structural layers, different types of foam materials and layers of foam materials for energy absorption, interior compartments and cavities for housing and protecting the electronic components, internal locks which can be remotely controlled electronically, and concealed case controls or an external control panel.

These and other features and aspects of the disclosure and related inventions are further described herein with reference to the accompanying drawings.

DETAILED DESCRIPTION OF PREFERRED AND ALTERNATE EMBODIMENTS

The protective enclosures may be adapted for a wide variety of articles and suit a variety of industries and uses, such as but not limited to: musical instruments such as, for example, guitars, violins, cellos, etc. (and accompanying components such as reeds, strings, bows, and other accessories); musical equipment such as, for example, sound systems, cables, pedals, microphones, lights; sports and recreation equipment, such as, for example skis, ice skates, golf clubs, fishing rods, firearms, etc.; electronics equipment such as, for example, laptop computers; textile or cloth items such as, for example, blankets, drapes, gowns, fur coats furniture; food/beverage such as, for example, wine; fine artwork; jewelry; cigars; antiques and heirlooms; collectibles, memorabilia and keepsakes. In general, the device may be used for any item or items, the value of which may be compromised by climate damage, breakage or other irreparable or irreversible damage (such as fire or water hazards), theft or loss. The device may be designed to contain and protect a single item or multiple items of the same or different kind. Given the variety of item or items, which benefit from the device of the present invention, the physical housing or container may take on a variety of shapes and configurations. For example, a musical instrument such as a guitar will require a differently configured case or housing than say, an item of jewelry or a bottle or bottles of wine. Therefore, the device housing may be in the form of a vault, a suit case, a gear or duffle bag, a briefcase, an instrument case, or any other standardized casing or customized design.

The form of the enclosure may vary depending on the size and configuration of the article or articles or items to be contained therein. The enclosure may be hermetically sealed and virtually airtight to secure the contents of the housing against entry of microorganisms or other foreign bodies. The interior of the enclosure may contain a generalized configuration to allow more versatility in the type or variety of items, which can be safely contained therein or the interior may be more specifically customized to a particular item in which the user intends to store and transport therein. Alternatively, the interior may be fitted to accommodate a variety of interchangeable interiors, allowing further flexibility while maintaining maximum protection for the housing contents. As with the size and shape of the enclosure, the interior may be general in nature or may be highly customized, depending on the needs of the user. Any number and types of materials may be used to provide a plush and protective interior.

Figure 3:
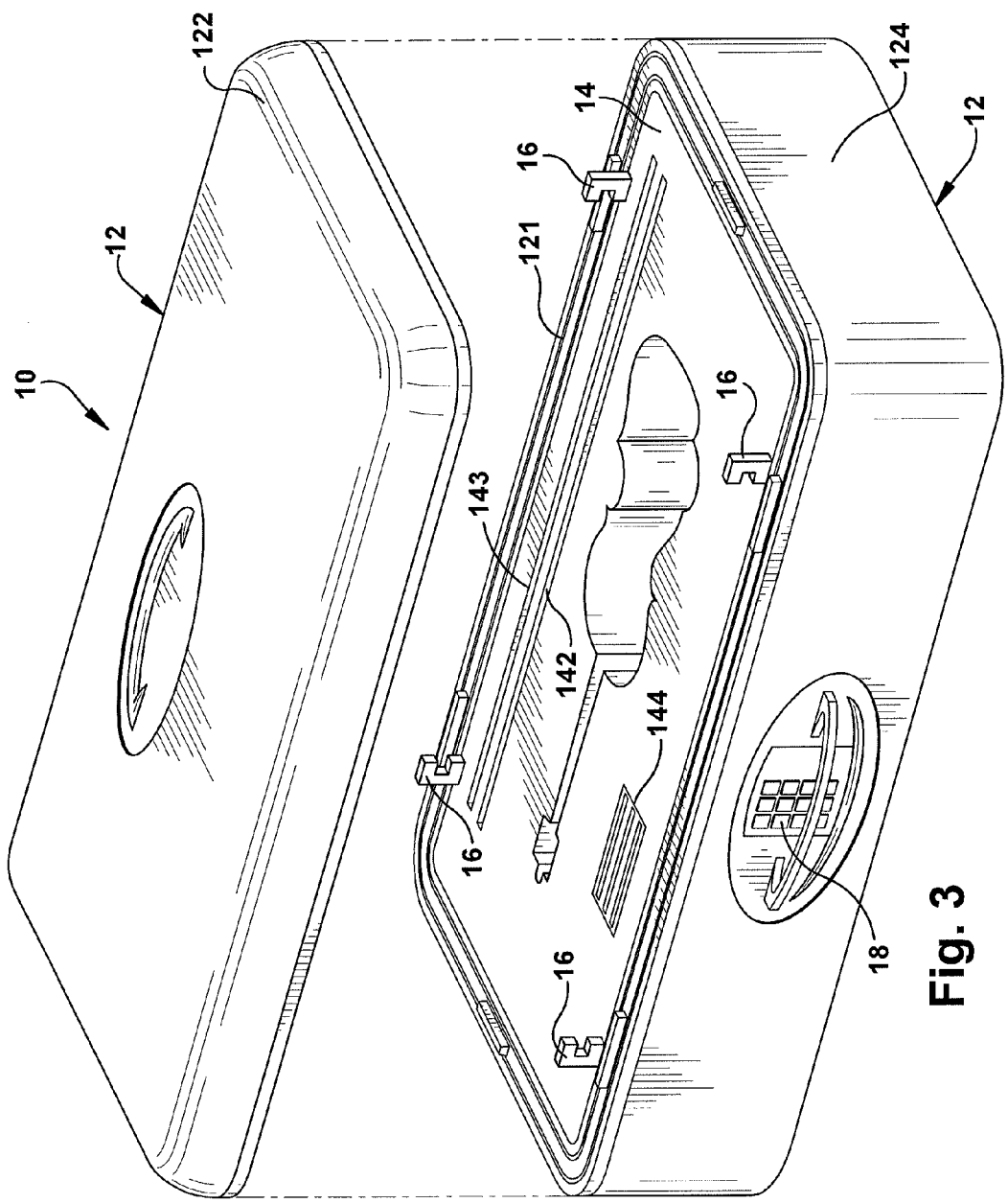
FIG. 3 is a conceptual view of one embodiment of a portable security and protection device of present invention.

An exemplary embodiment of a portable security and protection device of the present invention is shown in FIG. 3 indicated generally at 10. This embodiment has an exterior shell 12 with a generally cubic shape, and an interior, which contains an insert 14 with cavities 141, 142, 143 configured to receive a violin or viola and accompanying bows. Additional optional features of the device housing may include, but are not limited to: a built-in stand or shelf located within the interior of the housing to aid in performing maintenance, protective wrapping or cleaning duties; wheels on the outer shell 12 of the housing to aid in stacking, storing and/or transporting multiple containers; an interior light; and a USB port for data storage and/or historical parameter tracking and related statistics. Alternatively, the shell 12 may be combined with a lid or cover 122 attached by a hinge along one side of the mating frame 121, wherein the hinge is concealed or otherwise tamper-proof.

Just as the physical features of the housing may range anywhere from generalized to highly customized, the protective enclosure may also contain a variety of optional anti-theft, anti-breakage and climate control features, depending on the needs of the user. The device may contain one or more of these features, described in more detail directly below and shown in FIGS. 2 and 3.

Anti-breakage features of the protective enclosure may include an ultra-durable, lightweight and hermetically sealed exterior shell 12. The shell 12 may have impact-resistance of up to 2,500 psi made of a highly durable, rugged, but lightweight material to facilitate ease-of-transport without compromising the anti-breakage properties of the device. Materials used on the interior and exterior of the shell 12 may be fireproof and/or water-resistant. The outer shell of the housing may be made using a composite material (e.g., two layers of carbon fiber reinforced with an intermediate honeycomb aluminum or composite material layer), to aid in insulation and thermal conductivity, as well as an anti-breakage measure. The outer shell may include shock-resistant material and/or contain or be connected to shock or G-force sensors. The interior lining of the enclosure or separate inserts 14 may be made of closed cell memory foam, polyurethane or polyethylene foam, visco-elastic or latex foams of combinations thereof, or other suitable materials for energy absorption, anti-breakage and/or shock resistance insulation and humidity control. Also formed in the insert 14 is at least one additional cavity 144 which is for one or more electronic devices, as further described. The electronic device cavity 144 may be exposed or accessible through a surface of the insert 14 as shown, or completely concealed within the insert 14.

One or more accelerometers may be attached to or contained within the enclosure 10 and in connection with the internally contained electronics monitor and record speed and direction. An accelerometer measures the amount of acceleration due to gravity, thereby determining the angle it is tilted at with respect to the earth. This can help to detect rapid acceleration and to determine when a collision has occurred along with the severity of the collision. Accelerometers may also be used to detect and report out vibration.

Anti-theft measures may also be integrated with the portable security and protection device of the present invention. For example, a Radio Frequency Identification (RFID) locking system may be used to improve security and ease access to the device by an authorized user. The RFID lock will lock and unlock itself with the wave of a key fob, card or tag in front of a card reader which is installed in the device housing. A controller accepts data from the card reader and controls the output of the lock. There is no key-hole which prevents any conventional lock-picking. The device housing may also contain, in addition to, or in place of an RFID lock, an optional keypad 16 whereby a user may enter a Personal Identification Number (PIN) to gain keyless access to the device. The keypad 16 may be of the electro-mechanical type with push buttons, or a virtual keypad displayed on a capacitive or other type of electronic display. Alternatively, or in addition to the RFID locking system, a biometric lock may be installed in the enclosure. A biometric locking system uses fingerprint scanning, retinal scanning or voiceprint identification to authenticate users attempting to gain access to the device.

A traceable transceiver can also be incorporated into the enclosure, for interface with a tracking system to allow real-time location tracking, including web and/or smart phone tracking capabilities. Once the transceiver is installed within the enclosure, an identification number is registered in a database, which interfaces with the National Crime Information Center (NCIC) system used by federal, state and local law enforcement agencies throughout the United States. In the event that the enclosure is stolen, the user may report the incident to the police or other network monitor, thereby triggering a signal to the radio transceiver, which can send out signals to tracking units, for example in police vehicles. The owner may also choose to have some type of alarm notification if the enclosure moves, or for example is moved more than pre-determined distance from a designated location, or if the latches 16 are disengaged. The user may also manually override the tracking system for chain of custody allowance (to deactivate alarms).

An optional Global Positioning System (GPS) unit may also be installed within the housing. The GPS unit is able to determine the precise location of the device and to record the position of the device at regular intervals. This information can be transmitted to a central database and be accessed via an internet-connected computer, a smart phone or other electronic device. The enclosure location may be displayed against a map backdrop in real time, allowing the owner to pinpoint the location of the enclosure at all times.

One or more cameras or video recording devices may also be mounted on or within the enclosure with visibility through the shell 12 to enable monitoring of the enclosure's environment and surrounding areas of the enclosure from a remote location. It is rugged and weatherproof for extended unmanned use as the case moves in transit. The remote camera can capture still images or video either at pre-set timing intervals or on command from a remote user via an interne connected computer, smart phone or other electronic device, as further described. One or more camera eyes may be installed at various locations on and within the device housing and through the shell 12.

Heavy-duty lock latches and gaskets, interior latches and hinge-less lids may also be used to prevent unwanted or unauthorized entry of the device. As shown in FIG. 3, latches 16 are located on the interior side of shell 12, for example proximate to a perimeter frame 121 where the lid 122 fits to the base 124 of the shell 12. The latches 16 engage with a corresponding pawl in the lid 122. The latches 16 can be of the motorized mechanical type, electronically controlled to engage and disengage, either simultaneously or in sequence. Control may be via the described keypad, for example by entry of a code, or via a remote control device. In a preferred embodiment, the combined latch force draws the lid 122 into engagement with the base 124 to form a water-tight and air-tight seal about the perimeter frame 121. The latch status—open, closed, locked—can be relayed to the control electronics and transmitted as part of the enclosure status data as described.

The enclosures and cases may optionally include climate monitoring. Specifically with respect to articles which are porous in nature and susceptible to changes in temperature and humidity. These articles may include but are not limited to: musical instruments; clothing; furniture; antiques; documents; cigars; artwork; and many other such items. The device may contain one or more sensors, such as thermistor temperature sensors and relative humidity sensors, which monitor the temperature and/or humidity within the device housing. Various temperature and/or humidity thresholds may be pre-set by the device owner or user to monitor conditions wherein the temperature and/or humidity readings may be harmful to the contents of the device. One or more alarms may be used to alert the device owner or user to such situations. In addition to alarms, the device housing may contain a screen, which displays the interior temperature and/or humidity at all times. In addition to temperature and/or humidity monitoring, the device may additionally include means which will provide temperature and/or humidity control within the device interior. Pre-set threshold values may be used to determine whether the temperature and/or humidity may adversely affect the contents of the device housing. In such situation, the device may contain means to automatically control the temperature and/or humidity, bringing the device interior into the range of acceptable temperature and/or humidity readings. A more detailed description of this feature is available in U.S. Patent Application Publication No. U.S. 2010-0012739-A1, entitled "Portable Humidity and Temperature Control and Monitoring Device and System", the entirety of which is incorporated herein by reference.

Figure 1:
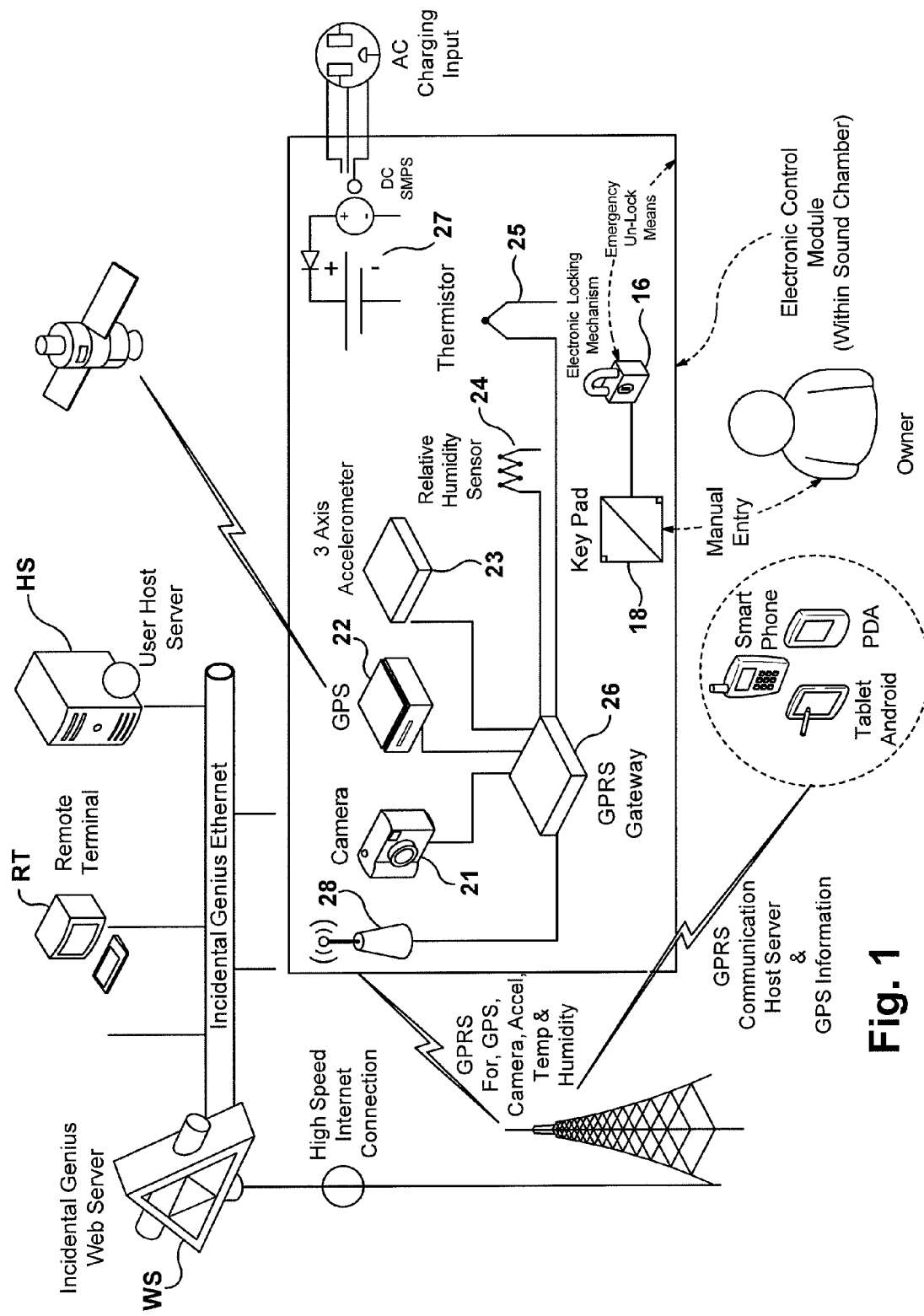
FIGS. 1 and 2 are a system-level schematics of a preferred embodiment of the present invention providing an overall view of the architecture and connectivity to the communication infrastructure.

As mentioned above, various optional features of the portable security and protection enclosures of the present invention include status and condition monitoring devices such as GPS tracking, remote camera access, accelerometer, and relative temperature and humidity sensors. These condition-monitoring devices measure or capture information which is helpful to the owner or user in accessing the condition and relative safety or security of the enclosure contents. The enclosure condition and status information is even more helpful if the owner or user may monitor this information in real-time or be notified of critical conditions. Allowing the enclosure owner or user to query for this information or be automatically informed of this information in real-time requires the use of some type of data transmission or transfer service. A system-level schematic showing the architecture and connectivity to the communication infrastructure is shown in FIG. 1. General Packet Radio Service (GPRS) is a way of sending data through radio waves that are currently being used to transmit voice (as opposed to bouncing radio waves off of orbiting satellites, as in GPS technology). The data is in digital form and is sent out in packets (transfer is achieved by breaking down data into packets or mini-bursts before sending it, and then reassembling the data after is has been transmitted and received). There are two major advantages in using GPRS over other mobile communication systems, such as Global Systems for Mobile Communications (GSM) and Short Messaging System (SMS) aka text messaging. Data sent via the (GSM) network is circuit switched, meaning that when data is sent via GMS, a channel is reserved and data is transmitted. Users are charged for the time the channel is reserved. SMS data is sent via the GSM network but can only contain 140 characters making the transmission of large amounts of data or messages with short intervals very expensive. While GPRS data is also transmitted through the GSM network, the GPRS data is "always on" and packet switched. Users are charged for the amount of data that is being transported and not for the time that the unit is online. GPRS uses network capacity more effectively and allows mobile handsets to obtain much higher data speeds than what standard GSM can offer.

Preferably, the portable security and protection enclosures having one or more of the condition monitoring options described above also provide a way for device owners or users to query or to receive such monitored conditions in real time (or as close to real time as possible). A portable security and protection enclosure web server is used to provide a way for users to gain access to this information. The web server WS uses a high-speed internet connection to access the GPRS data retrieved from the condition monitoring devices. This information is stored and made available to registered users via website. Users may connect to the website, such as, for example, over a remote internet-connected computer terminal RT. Registered users will have registration credentials such as a username and/or password with which to gain access to the user's enclosure information stored on the portable security and protection device web server. Once a user gains access to the information by providing the appropriate username and/or password, the user may query certain monitored aspects of his/her case such as, for example, the precise location of the case, real-time photos or video of the case and/or its surroundings, or the interior temperature or humidity. Users may also be notified directly via their smart phone, tablet, personal digital assistant (PDA), or other such device, when certain pre-set conditions are met or not met. Users may sign up (via the portable security and protection device web site) to be notified when monitored conditions are outside the range of pre-set user threshold values, when the case has reached a certain location, when the case has been damaged or dropped, when the case has been tampered with or other such user defined conditions. The web server WS, remote terminals RT, user host server HS, and wireless devices such as PDA, smart phones and tablets by which data from the electronic devices within the shell 12 is received, or by which the electronic devices within the shell 12 are controlled, are referred to herein as "external devices". Remote wireless connection to case status monitoring may be via a wireless application which includes a user interface for inputting case and owner identification information, and displays for data retrieved from each of the various sensors or electronic devices.

Figure 2:
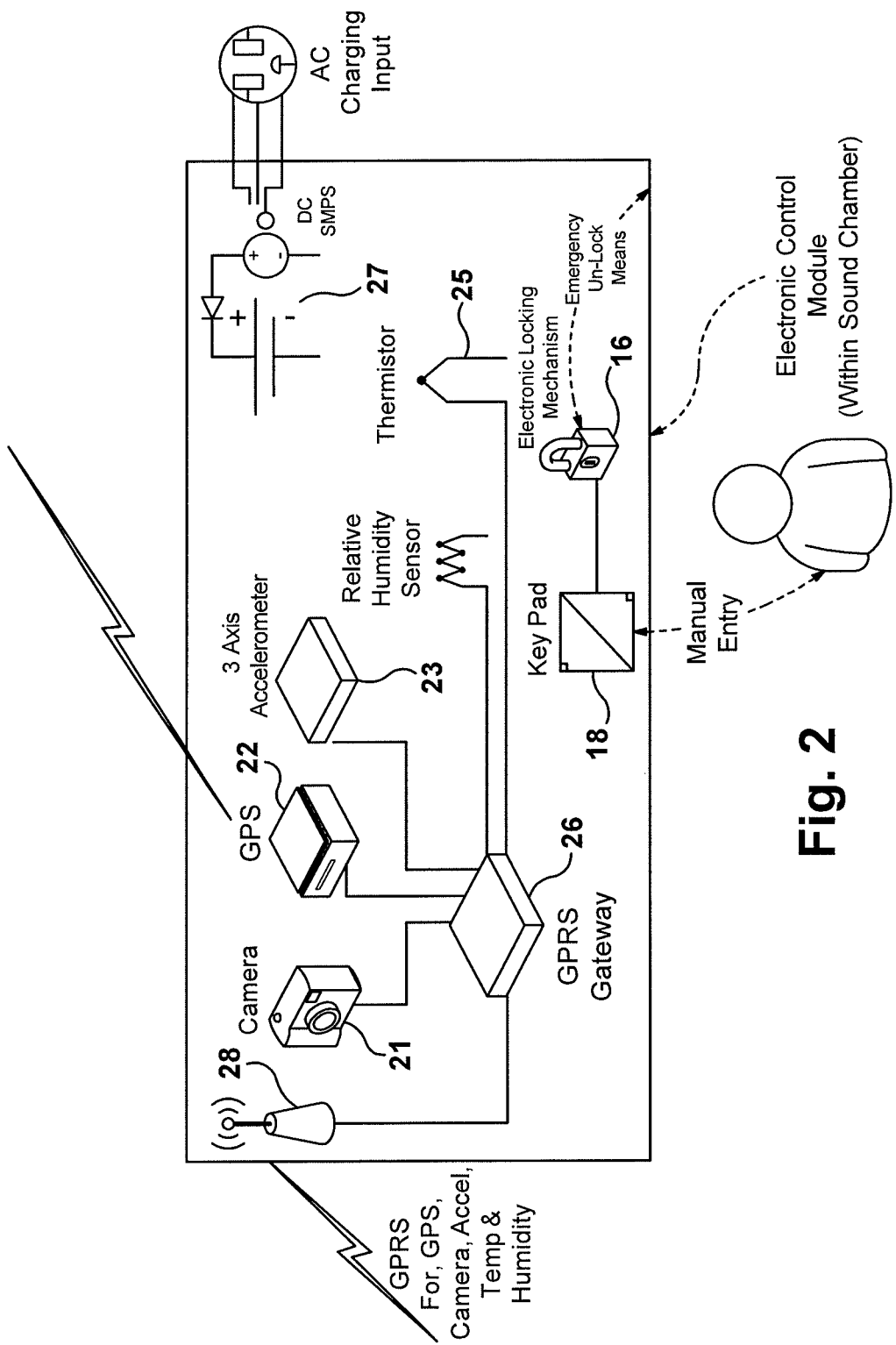

As further illustrated in FIGS. 1 and 2, the monitoring devices which may be included in the case or enclosure 10 include, without limitation and in no particular combination, one or more of: camera 21, GPS transceiver 22, accelerometer 23, humidity sensor 24, thermistor 25, GPRS gateway controller 26, DC power source 27 with AC charging input, battery pack, antenna 28, keypad 18, electronic latches 16 with lock function, each suitable configured and operatively connected to necessary control electronics also located within the shell 12, as indicated in FIG. 2. Electronic circuitry for powering and operating the electronic devices, including necessary infrastructure such as one or more circuit boards, power circuit, permanent and temporary memory, processing capability such as a microprocessor and switching is also preferably contained within the enclosure and preferably within one or more cavities in the insert 14. Alternatively, one or more of the electronic devices may be located in the shell 12.

The cases and enclosures disclosed herein may take any number of forms or configurations, so long as the ability to instantaneously detect and alter housing interior environmental conditions, as well as anti-breakage, anti-theft and ease-of-transport performance characteristics are maintained. Though the inventions have been described herein with reference to certain embodiments, one skilled in the art will appreciate the applicability of the basic premise of the invention to applications controlling and monitoring climate, employing theft-deterrents, anti-breakage and ease-of transport qualities of the housing for many articles that could potentially suffer degradation or loss, due to changes or infiltration in the same. As such, all potential applications are intended to be covered by the invention.

What is claimed is:

1. A portable security and protective enclosure for holding, protecting and monitoring the status of article contents, the portable security and protective enclosure comprising:
a rigid outer shell defining an interior cavity configured to receive one or more articles, the outer shell having at least one access panel through which access to the interior cavity, the at least one access panel configured to engage with a corresponding part of the shell about a perimeter frame to close and seal the interior cavity,
at least one latch operative to secure the at least one access panel to the corresponding part of the shell, the at least one latch located within the perimeter of the corresponding part of the shell with which the access panel is engaged, the at least one latch operative to engage the access panel by remote electronic operation of the at least one latch;
a humidity sensor; and
a GPRS transceiver coupled with the humidity sensor;
wherein the GPRS transceiver is operable to transmit data acquired from the humidity sensor to at least one external device suitably configured and operatively connected to a GPRS gateway.

2. The portable security and protective enclosure of claim 1 wherein the shell is generally cubic, wherein the lid comprises at least one side of the generally cubic shell, and the perimeter extends along four sides of the generally cubic shell.

3. The portable security and protective enclosure of claim 2 comprising at least two latches located within the perimeter and alone one side of the generally cubic shell.

4. The portable security and protective enclosure of claim 2 wherein the at least two latches are electro-mechanical latches.

5. The portable security and protective enclosure of claim 4 wherein the latches are operative to indicate latch status to the control circuitry.

6. The portable security and protective enclosure of claim 1 further comprising an insert in the interior cavity of the shell, the insert having an insert cavity configured to receive at least one article, and a device configured to receive at least one electronic device.

7. The portable security and protective enclosure of claim 1 further comprising a keypad operative to control one or more of the electronic devices.

8. The portable security and protective enclosure of claim 7 wherein the keypad is located on an exterior of the enclosure.

9. The portable security and enclosure of claim 1 wherein at least one electronic device is located in the shell.

10. The portable security and protective enclosure of claim 1, wherein the GPRS transceiver is operable to send an alarm to a device owner responsive to the humidity exceeding a threshold.

11. A portable security and protective case for receiving and holding on or more articles, the case having one or more sensors or devices for providing remotely accessible information regarding the environmental and geographical status of the case and the one or more articles, including temperature, humidity and shock sensors; and cameras for providing external visual information; GPS for accessing the geographical location; electronic and mechanical locking system; hinge-less cover which assists in discouraging unauthorized access; wireless gateway which assembles this information into a form which is wirelessly communicated to a remote server.

12. The protable security and protective case of claim 11, further comprising an accelerometer for providing data representative of one of a group consisting of acceleration and vibration.

* * * * *